United States Patent
Luo

(10) Patent No.: US 11,930,399 B2
(45) Date of Patent: Mar. 12, 2024

(54) METHOD, DEVICE AND SYSTEM FOR IMPLEMENTING EDGE COMPUTING

(71) Applicant: ZTE CORPORATION, Guangdong (CN)

(72) Inventor: Xujian Luo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 120 days.

(21) Appl. No.: 17/622,297

(22) PCT Filed: Aug. 12, 2020

(86) PCT No.: PCT/CN2020/108672
§ 371 (c)(1),
(2) Date: Dec. 23, 2021

(87) PCT Pub. No.: WO2021/027842
PCT Pub. Date: Feb. 18, 2021

(65) Prior Publication Data
US 2022/0272578 A1 Aug. 25, 2022

(30) Foreign Application Priority Data
Aug. 13, 2019 (CN) .......................... 201910744262.1

(51) Int. Cl.
*H04W 28/08* (2023.01)
*H04W 4/24* (2018.01)
*H04W 4/50* (2018.01)
*H04W 24/02* (2009.01)
*H04W 88/18* (2009.01)

(52) U.S. Cl.
CPC ......... *H04W 28/0942* (2020.05); *H04W 4/24* (2013.01); *H04W 4/50* (2018.02); *H04W 24/02* (2013.01); *H04W 88/18* (2013.01)

(58) Field of Classification Search
CPC ..... H04W 28/0942; H04W 4/24; H04W 4/50; H04W 24/02; H04W 88/18; H04L 65/40;
(Continued)

(56) References Cited

U.S. PATENT DOCUMENTS

2017/0339101 A1 11/2017 Suga
2019/0158300 A1* 5/2019 Sabella .................. H04L 67/10
(Continued)

FOREIGN PATENT DOCUMENTS

CN 106507326 A 3/2017
CN 107087019 A 8/2017
(Continued)

OTHER PUBLICATIONS

WIPO, International Search Report dated Oct. 28, 2020.
(Continued)

*Primary Examiner* — Huy C Ho
(74) *Attorney, Agent, or Firm* — Li & Cai Intellectual Property (USA) Office

(57) ABSTRACT

Provided by the present application are a method, device and system for implementing edge computing. The method includes: determining, when a load of at least one resource of a multi-access edge computing (MEC) server meets a preset condition, at least one intelligent terminal participating in edge computing; assigning, for each intelligent terminal participating in edge computing, at least one edge computing task of the MEC server to the intelligent terminal participating in edge computing, and issuing the at least one assigned edge computing task to the intelligent terminal participating in edge computing; and receiving a handling result of the at least one assigned edge computing task sent from the intelligent terminal participating in edge comput-
(Continued)

ing, and sending to a charging network element information about participation in MEC of the intelligent terminal participating in edge computing.

20 Claims, 9 Drawing Sheets

(58) Field of Classification Search
CPC . H04L 67/10; H04L 41/5054; H04L 43/0876; H04L 41/0806; H04L 41/5041; H04L 67/51; H04M 15/00; H04M 15/8027
USPC .......................................................... 455/406
See application file for complete search history.

(56) References Cited

U.S. PATENT DOCUMENTS

| | | | |
|---|---|---|---|
| 2019/0245789 A1 | 8/2019 | Sabella et al. | |
| 2020/0275313 A1* | 8/2020 | He | H04W 28/0838 |
| 2020/0358673 A1 | 11/2020 | Ren et al. | |

FOREIGN PATENT DOCUMENTS

| | | |
|---|---|---|
| CN | 107249218 A | 10/2017 |
| CN | 108494612 A | 9/2018 |
| CN | 109462652 A | 3/2019 |
| CN | 110059055 A | 7/2019 |
| CN | 110086844 A | 8/2019 |
| CN | 110099384 A | 8/2019 |
| KR | 20090097225 A | 9/2009 |

OTHER PUBLICATIONS

Korean Patent Office, KR10-2021-7041999 First Office Action dated Mar. 22, 2023.
China Patent Office, CN201910744262.1 First Office Action dated Apr. 28, 2023.
European Patent Office, EP20852821.6 Extended European Search Report dated Jun. 22, 2023.

* cited by examiner

METHOD, DEVICE AND SYSTEM FOR IMPLEMENTING EDGE COMPUTING

Embodiments of the present disclosure relate to, but are not limited to, the field of communications.

BACKGROUND

The 5G communication network is suitable for many different application scenarios due to its characteristics including high speed (e.g., enhanced Mobile Broadband (eMBB)), large capacity (e.g., massive Machine Type of Communication (mMTC)), and low latency (e.g., Ultra Reliable Low Latency Communication (URLLC)). A current 5G communication network architecture, as shown in FIG. 1, is composed of a Core Network (CN), a Transport Network (TN), a Radio Access Network (RAN), and User Equipment (UE).

Although the indexes such as speed, latency and the like are greatly improved in the 5G wireless network, the latency may still be greatly increased if all the computing or control is completed by the CN, and technically, may not meet the requirement of millisecond-level latency. In addition, this may involve many kinds of 5G connection and a massive amount of data communication, wherein lots of the data actually do not need to be processed through the CN. For these reasons, edge computing has become a more and more favored network deployment mode across the industry. FIG. 2 is a schematic diagram of a network architecture of multi-access edge computing (MEC). As shown in FIG. 2, by deploying the MEC server in the RAN as local as possible, the computing is sunk to the network edge, which may provide better services to the user: lower latency, higher throughput, more diverse services. Certainly, the deployment of the MEC server requires additional investment cost, and higher cost is required for higher service capacity; furthermore, the computing power of the deployed MEC has a certain capacity limit, which may still cause network congestion or service degradation in the case of sudden increase of too many users.

SUMMARY

In one aspect, the present disclosure provides a method for implementing edge computing, including: determining, when a load of at least one resource of a multi-access edge computing (MEC) server meets a preset condition, at least one intelligent terminal participating in edge computing; assigning, for each intelligent terminal participating in edge computing, at least one edge computing task of the MEC server to the intelligent terminal participating in edge computing, and issuing the at least one assigned edge computing task to the intelligent terminal participating in edge computing; and receiving a handling result of the at least one assigned edge computing task sent from the intelligent terminal participating in edge computing, and sending to a charging network element information about participation in MEC of the intelligent terminal participating in edge computing.

In another aspect, the present disclosure further provides a method for implementing edge computing, including: receiving an assigned edge computing task issued from a multi-access edge computing (MEC) server; and handling the assigned edge computing task correspondingly, and sending a handling result of the assigned edge computing task to the MEC server.

In another aspect, the present disclosure further provides a method for implementing edge computing, including: receiving information about participation in multi-access edge computing (MEC) of an intelligent terminal participating in edge computing, the information being sent from an MEC server; and carrying the information about participation in MEC of the intelligent terminal participating in edge computing in charging information and sending the charging information to a charging system.

In another aspect, the present disclosure further provides a method for implementing edge computing, including: receiving charging information sent from a charging network element; wherein the charging information includes information about participation in multi-access edge computing (MEC) of an intelligent terminal participating in edge computing; and calculating, according to the information about participation in MEC of the intelligent terminal participating in edge computing, a deserved gain for a user to which the intelligent terminal participating in edge computing belongs, and paying the gain to the user to which the intelligent terminal participating in edge computing belongs in real time or periodically.

In another aspect, the present disclosure further provides a device for implementing edge computing, including a processor, and a computer readable storage medium having instructions stored thereon which, when executed by the processor, cause any of the methods for implementing edge computing as described herein to be implemented.

In another aspect, the present disclosure further provides a computer readable storage medium having a computer program stored thereon which, when executed by a processor, causes operations of any of the methods for implementing edge computing as described herein to be implemented.

In another aspect, the present disclosure further provides a device for implementing edge computing, including: an intelligent terminal determining module configured to determine, when a load of at least one resource of a multi-access edge computing (MEC) server meets a preset condition, at least one intelligent terminal participating in edge computing; an edge computing task sinking module configured to assign, for each intelligent terminal participating in edge computing, at least one edge computing task of the MEC server to the intelligent terminal participating in edge computing, and issue the at least one assigned edge computing task to the intelligent terminal participating in edge computing; and receive a handling result of the assigned edge computing tasks sent from the intelligent terminal participating in edge computing, and send to a charging network element information about participation in MEC of the intelligent terminal participating in edge computing.

In another aspect, the present disclosure further provides a device for implementing edge computing, including: an edge computing task receiving module configured to receive an assigned edge computing task issued from a multi-access edge computing (MEC) server; and an edge computing task handling module configured to handle the assigned edge computing task correspondingly, and send a handling result of the assigned edge computing task to the MEC server.

In another aspect, the present disclosure further provides a device for implementing edge computing, including: an information receiving module configured to receive information about participation in multi-access edge computing (MEC) of an intelligent terminal participating in edge computing, the information being sent from an MEC server; and an information sending module configured to carry the information about participation in MEC of the intelligent terminal participating in edge computing in charging information and send the charging information to a charging system.

In another aspect, the present disclosure further provides a system for implementing edge computing, including: a charging information receiving module configured to receive charging information sent from a charging network element; wherein the charging information includes information about participation in multi-access edge computing (MEC) of an intelligent terminal participating in edge computing; and a gain calculation module configured to calculate, according to the information about participation in MEC of the intelligent terminal participating in edge computing, a deserved gain for a user to which the intelligent terminal participating in edge computing belongs, and pay the gain to the user to which the intelligent terminal participating in edge computing belongs in real time or periodically.

In another aspect, the present disclosure further provides a system for implementing edge computing, including: a multi-access edge computing (MEC) server configured to determine, when a load of at least one resource of the MEC server meets a preset condition, at least one intelligent terminal participating in edge computing; assign, for each intelligent terminal participating in edge computing, at least one edge computing task of the MEC server to the intelligent terminal participating in edge computing, and issue the at least one assigned edge computing tasks to the intelligent terminal participating in edge computing; and receive a handling result of the at least one assigned edge computing task sent from the intelligent terminal participating in edge computing, and send to a charging network element information about participation in MEC of the intelligent terminal participating in edge computing; one or more intelligent terminals participating in edge computing; wherein each intelligent terminal participating in edge computing is configured to receive an assigned edge computing task issued from a multi-access edge computing (MEC) server; and handle the assigned edge computing task correspondingly, and send a handling result of the assigned edge computing task to the MEC server; a charging network element configured to receive information about participation in MEC of an intelligent terminal participating in edge computing, the information being sent from the MEC server; and carry the information about participation in MEC of the intelligent terminal participating in edge computing in charging information and send the charging information to a charging system; and a charging system configured to receive charging information sent from a charging network element; wherein the charging information includes information about participation in multi-access edge computing (MEC) of an intelligent terminal participating in edge computing; and calculate, according to the information about participation in MEC of the intelligent terminal participating in edge computing, a deserved gain for a user to which the intelligent terminal participating in edge computing belongs, and pay the gain to the user to which the intelligent terminal participating in edge computing belongs in real time or periodically.

BRIEF DESCRIPTION OF DRAWINGS

Accompanying drawings are provided for further understanding of the technical solution of the embodiments of the disclosure and constitute a part of the specification. Hereinafter, these drawings are intended to explain the technical solution of the disclosure together with the following exemplary embodiments, but should not be considered as a limitation to the technical solution of the embodiments of the disclosure.

DETAIL DESCRIPTION OF EMBODIMENTS

Embodiments of the present disclosure will be described in detail below with reference to the accompanying drawings. It should be noted that the embodiments of the disclosure and features herein may be combined with each other in any manner as long as they are not contradictory.

The operations illustrated in the flowchart of the drawings may be executed in a computer system such as a set of computer executable instructions. Also, although a logical order is shown in the flowchart, in some cases, the operations shown or described may be performed in a different order than illustrated herein.

In an embodiment of the present disclosure, considering that the intelligent terminal has certain computing, storing, network and sensing capabilities, but generally is used only for local computing at present, the computing power of the terminal can be fully utilized if the intelligent terminal can also be incorporated into a capability set of edge computing; and the computing power will also be enhanced with the increase of terminals, thereby reducing an impact of the increased terminals on the edge computing network.

Apparently, to incorporate the intelligent terminal into the provider for the edge computing power, some related problems of access, security, charging and the like need to be solved. For example, from a security perspective, how to ensure that a terminal is trusted and the computing result of the terminal is reliable? From the user's perspective, what benefit will they get by consuming terminal resources? How to avoid influence on their own usage when participating in edge computing? From a technical perspective, how to incorporate a terminal into an edge computing cluster? These are all problems to be solved regarding the terminal participating in edge computing.

The following describes a specific implementation method for incorporating an intelligent terminal into a provider for the edge computing power.

It should be noted that the intelligent terminal in the embodiments of the present disclosure refers to a device which has a microprocessor and can perform data processing, storage, and Input Output (IO), such as a mobile phone, a camera, a computer, etc. The terminal in the embodiments of the present disclosure refers to an intelligent terminal, unless otherwise specified.

Figure 1:
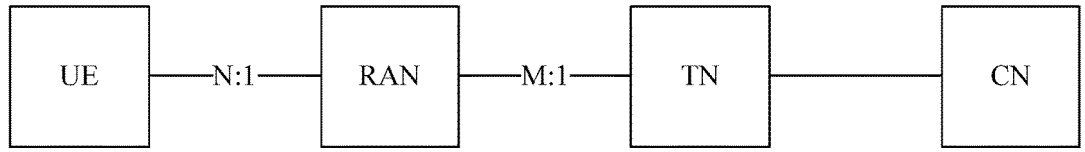
FIG. 1 is a schematic diagram of a 5G communication network architecture in the existing art.
Figure 2:
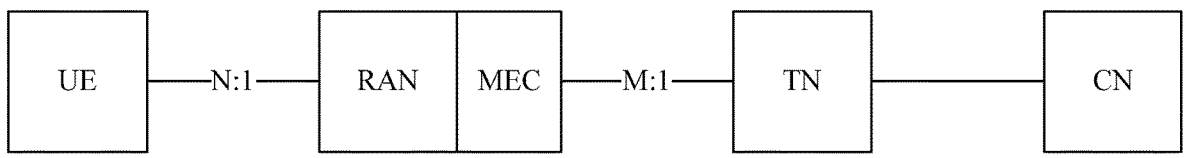
FIG. 2 is a schematic diagram of a 5G MEC network architecture in the existing art.
Figure 3:
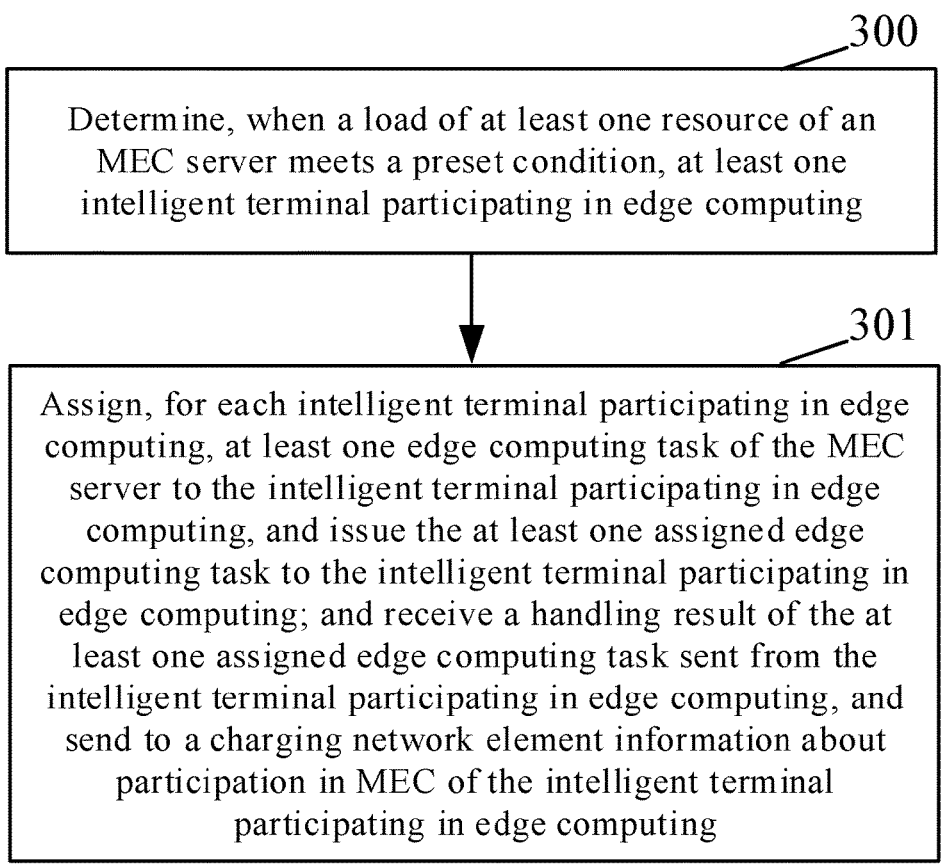
FIG. 3 is a flowchart of a method for implementing edge computing according to an embodiment of the present disclosure.

Referring to FIG. 3, an embodiment of the present disclosure provides a method for implementing edge computing, which may include operations 300 and 301.

At operation 300, when a load of at least one resource of a multi-access edge computing (MEC) server meets a preset condition, at least one intelligent terminal participating in edge computing is determined.

In an illustrative example, the resource includes at least one of: a central processing unit (CPU) resource, a memory resource, a storage resource, a network input/output (IO) resource, or sensed data.

Apparently, the resource may include other kinds of resources, as long as it is a resource in the MEC server.

In an illustrative example, the load of the resource meeting the preset condition includes the case where the load of the resource is greater than or equal to a preset threshold.

In an embodiment of the present disclosure, the intelligent terminal participating in edge computing may be determined in various methods.

For example, the method includes acquiring online intelligent terminals capable of providing the resource having the load meeting the preset condition (i.e., the resource of the intelligent terminal having the same type as the resource of the MEC server, the load of which meets the preset condition); and selecting at least one intelligent terminal from the online intelligent terminals capable of providing the resource having the load meeting the preset condition.

For another example, the method includes determining whether both intelligent terminals initiating a service request are capable of providing the resource having the load meeting the preset condition, and determining, when both intelligent terminals initiating the service request are capable of providing the resource having the load meeting the preset condition, the at least one intelligent terminal participating in edge computing as the both intelligent terminals initiating the service request, such as the intelligent terminals UE1 and UE2 that initiate the service request in Example 4.

Apparently, there are many other implementation methods, which are not listed here, and the specific implementation method is not intended to limit the scope of the embodiments of the present disclosure.

In an embodiment of the present disclosure, the online intelligent terminals capable of providing the resource having the load meeting the preset condition may be acquired in various methods.

For example, the method includes searching subscription information of the online intelligent terminals for online intelligent terminal in the subscription information, each of which corresponding to one or more of the at least one resource having the load meeting the preset condition, as the online intelligent terminals capable of providing the resource having the load meeting the preset condition.

The user may sign a contract with the operator regarding participation in the edge computing service, and appoint the resource type shared by the intelligent terminal and the enjoyed gain so that the subscription information of the intelligent terminal includes the shared resource type negotiated with the operator; and the MEC server can obtain the subscription information when the intelligent terminal accesses the network.

For another example, the method includes searching a preset correspondence relation between intelligent terminals and resources for intelligent terminals each corresponding to one or more of the at least one resource having the load meeting the preset condition, and selecting online intelligent terminals from the found intelligent terminals as the online intelligent terminals capable of providing the resource having the load meeting the preset condition.

For another example, the method includes searching a preset correspondence relation among intelligent terminals, resources and states for intelligent terminals each corresponding to one or more of the at least one resource having the load meeting the preset condition and corresponding to an online state, and taking the found intelligent terminals as the online intelligent terminals capable of providing the resource having the load meeting the preset condition.

Apparently, there are many other implementation methods, which are not listed here, and the specific implementation method is not intended to limit the scope of the embodiments of the present disclosure.

In an embodiment of the present disclosure, the at least one intelligent terminal may be selected from the online intelligent terminals capable of providing the resource having the load meeting the preset condition in various methods.

For example, the method includes sending a first request to each online intelligent terminal capable of providing the resource having the load meeting the preset condition; the first request indicating: one or more of the at least one resource having the load meeting the preset condition; receiving a first response from the online intelligent terminal capable of providing the resource having the load meeting the preset condition, the first response including: information on idle resource or available resource included in the online intelligent terminal for a resource indicated in the first request; and selecting at least one online intelligent terminal sending the first response.

In an illustrative example, the first request may be a resource query and use request, and the first response may be a resource query and use response.

For another example, the method includes sending a first request to each online intelligent terminal capable of providing the resource having the load meeting the preset condition; the first request indicating: one or more of the at least one resource having the load meeting the preset condition; receiving a first response from the online intelligent terminal capable of providing the resource having the load meeting the preset condition, the first response including: information on idle resource or available resource included in the intelligent terminal for a resource indicated in the first request; sending a second request to the intelligent terminal sending the first response; the second request including: information on at least one of idle resource or available resource; receiving a second response from the intelligent terminal sending the first response; the second response including: information on sharable resource in the intelligent terminal for the resource indicated in the second request; and selecting at least one intelligent terminal sending the second response.

In an illustrative example, the first request may be a resource query request, the first response may be a resource query response, the second request may be a resource use request, and the second response may be a resource use response.

Apparently, there are many other implementation methods, which are not listed here, and the specific implementation method is not intended to limit the scope of the embodiments of the present disclosure.

At operation 301, for each intelligent terminal participating in edge computing, an edge computing task(s) of the MEC server is(are) assigned to the intelligent terminal participating in edge computing, and the assigned edge computing task(s) is(are) issued to the intelligent terminal participating in edge computing; and a handling result(s) of the assigned edge computing task(s) sent from the intelligent terminal participating in edge computing is(are) received, and information about participation in MEC of the intelligent terminal participating in edge computing is sent to a charging network element.

In an embodiment of the present disclosure, the operation of assigning the edge computing task(s) of the MEC server to the intelligent terminal participating in edge computing may be implemented in various methods.

For example, the method includes assigning an edge computing task(s) of the MEC server to the intelligent terminal participating in edge computing according to the information on idle resource or available resource in the intelligent terminal for the resource indicated in the first request. For example, the method includes assigning an edge computing task(s) that require(s) the idle resource or available resource in the intelligent terminal for the resource indicated in the first request to the intelligent terminal.

For another example, the method includes assigning an edge computing task(s) of the MEC server to the intelligent terminal participating in edge computing according to information on the sharable resource in the intelligent terminal for the resource indicated in the second request. For example, the method includes assigning an edge computing task(s) that require(s) the sharable resource in the intelligent terminal for the resource in indicated in the second request to the intelligent terminal.

Apparently, there are many other implementation methods, which are not listed here, and the specific implementation method is not intended to limit the scope of the embodiments of the present disclosure.

In an embodiment of the present disclosure, the assigned edge computing task may be included in a third request and issued to the intelligent terminal(s) participating in edge computing. In an illustrative example, the third request may be an edge computing task request (e.g., the computing sinking task request in Example 1, the computing distributing task request in Example 2, the data caching task request in Example 3, the network direct connection task request in Example 4, the sensed data report task request in Example 5, etc.).

In an illustrative example, the edge computing task includes any one of: a computing sinking task, a computing distributing task, a data caching task, a network direct connection task and a sensed data report task.

Apparently, the edge computing task may include other tasks, as long as it is a task that originally desired to be executed by the MEC server.

In another embodiment of the present disclosure, after issuing the assigned edge computing task(s) to the intelligent terminal participating in edge computing, and before receiving the handling result(s) of the edge computing task(s) sent from the intelligent terminal participating in edge computing, the method further includes: receiving a handling progress of the edge computing task(s) sent from the intelligent terminal participating in edge computing.

In another embodiment of the present disclosure, before issuing the assigned edge computing task(s) to the intelligent terminal participating in edge computing, the method further includes: establishing a secure connection with the intelligent terminal participating in edge computing; and communicating with the intelligent terminal participating in edge computing through the established secure connection.

It should be noted that, communicating with the intelligent terminal participating in edge computing through the established secure connection refers to that any information sent to the intelligent terminal participating in edge computing is sent through the established secure connection, and any information sent from the intelligent terminal participating in edge computing is received through the established secure connection.

In another embodiment of the present disclosure, after receiving the handling result(s) of the assigned edge computing task(s) sent from the intelligent terminal participating in edge computing, the method further includes: receiving a service request sent from an intelligent terminal not participating in edge computing, and establishing a connection between the intelligent terminal participating in edge computing and the intelligent terminal not participating in edge computing.

For example, a data request from UE2 is received in Example 3, and connection between UE1 and UE2 is established.

Apparently, there are many other service requests, which are not listed here, and the specific type of service request is not intended to limit the scope of the embodiments of the present disclosure.

Figure 4:
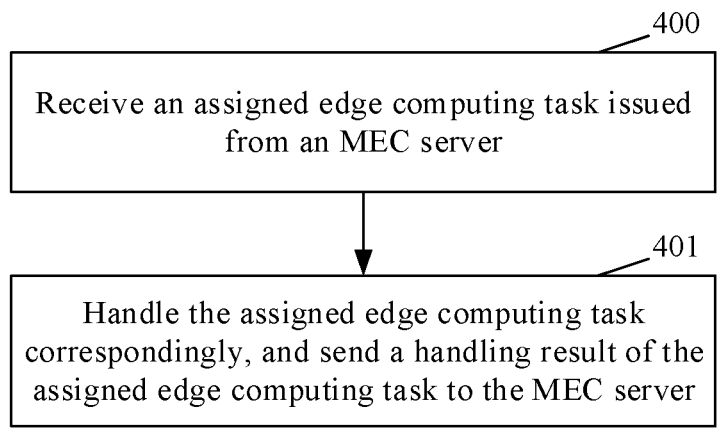
FIG. 4 is a flowchart of a method for implementing edge computing according to another embodiment of the disclosure.

Referring to FIG. 4, another embodiment of the present disclosure provides a method for implementing edge computing, which may include operations 400 and 401.

At operation 400, an assigned edge computing task issued from a multi-access edge computing (MEC) server is received.

At operation 401, the assigned edge computing task is handled correspondingly, and a handling result of the assigned edge computing task is sent to the MEC server.

In an embodiment of the present disclosure, handling the assigned edge computing task correspondingly may be implemented in a similar method to that for implementing handling the assigned edge computing task correspondingly by the intelligent terminal as described in Examples 1 to 5, which is not repeated here.

Apparently, the implementation procedures are not limited to those listed in Examples 1 to 5, and other implementation procedures also fall into the scope of the embodiments of the present disclosure.

In an embodiment of the present disclosure, the handling result of the assigned edge computing task may be processed data obtained after handling the assigned edge computing task correspondingly, or information indicating whether the handling is successful, or the like.

In another embodiment of the present disclosure, during the operation of handling the assigned edge computing task correspondingly, the method further includes: sending a handling progress of the assigned edge computing task to the MEC server.

It should be noted that the handling progress refers to a progress of the handling process, such as an intermediate result of the handling, a percentage of completion of the task, and the like.

In another embodiment of the present disclosure, before receiving the assigned edge computing task issued from the MEC server, the method further includes: establishing a secure connection with the MEC server; and communicating with the MEC server through the established secure connection.

It should be noted that communicating with the MEC server through the established secure connection refers to that any information sent to the MEC server is sent through the established secure connection, and any information sent from the MEC server is received through the established secure connection.

In another embodiment of the present disclosure, before receiving the assigned edge computing task issued from the MEC server, the method further includes: receiving a first request sent from the MEC server; the first request indicating one or more of at least one resource having a load meeting a preset condition in the MEC server; and sending a first response to the MEC server; the first response including: information on idle resource or available resource for the resource indicated in the first request.

In another embodiment of the present disclosure, after sending the first response to the MEC server, and before receiving the assigned edge computing task issued from the MEC server, the method further includes: receiving a second request sent from the MEC server; the second request including: information on at least one of idle resource or available resource; sending a second response to the MEC server; the second response including: information on sharable resource for the resource indicated in the second request.

In another embodiment of the present disclosure, after sending the handling result of the assigned edge computing task to the MEC server, the method further includes: establishing a connection with an intelligent terminal not participating in edge computing through the MEC server; and providing a service for the intelligent terminal not participating in edge computing through the established connection.

For example, in Example 3, after the connection between UE1 and UE2 is established, UE1 provides a data download service for UE2. Apparently, other services may be included, which are not listed here, and the specific type of service is not intended to limit the scope of the embodiments of the present disclosure.

Figure 5:
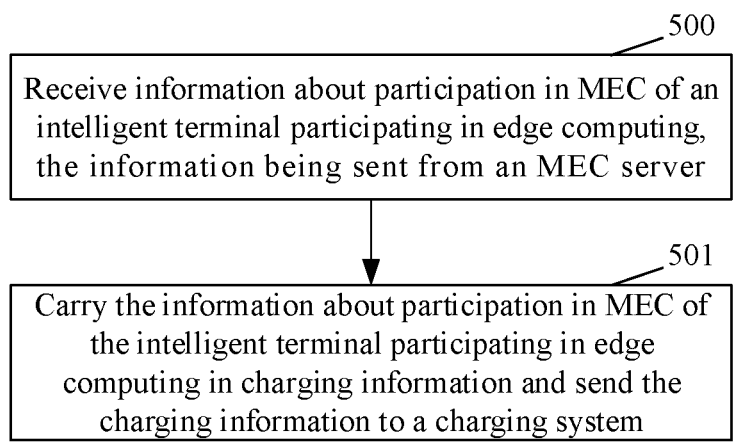
FIG. 5 is a flowchart of a method for implementing edge computing according to another embodiment of the disclosure.

Referring to FIG. 5, another embodiment of the present disclosure provides a method for implementing edge computing, which may include operations 500 and 501.

At operation 500, information about participation in multi-access edge computing (MEC) of an intelligent terminal participating in edge computing, which is sent from an MEC server, is received.

In an embodiment of the present disclosure, the information about participation in MEC of the intelligent terminal participating in edge computing refers to information that can prove that the intelligent terminal executes an edge computing task, such as a type of the resource used for executing the edge computing task, the time and the amount of data consumed for executing the edge computing task, and the like, which may be used in the subsequent charging rule.

At operation 501, the information about participation in MEC of the intelligent terminal participating in edge computing is carried in charging information and the charging information is sent to a charging system.

Figure 6:
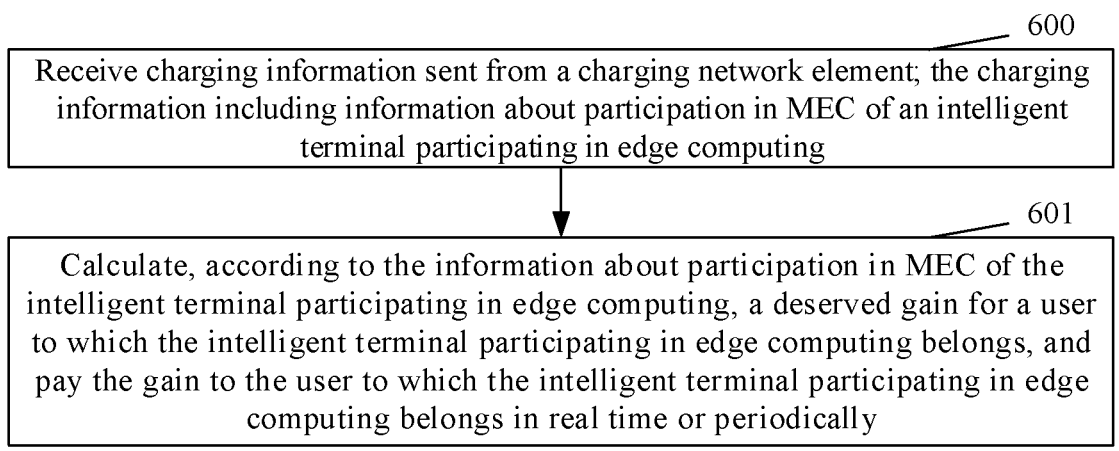
FIG. 6 is a flowchart of a method for implementing edge computing according to another embodiment of the disclosure.

Referring to FIG. 6, another embodiment of the present disclosure provides a method for implementing edge computing, which may include operations 600 and 601.

At operation 600, charging information sent from a charging network element is received; the charging information including information about participation in multi-access edge computing (MEC) of an intelligent terminal participating in edge computing.

At operation 601, a deserved gain for a user to which the intelligent terminal participating in edge computing belongs is calculated according to the information about participation in MEC of the intelligent terminal participating in edge computing, and the gain is paid to the user to which the intelligent terminal participating in edge computing belongs in real time or periodically.

In an embodiment of the present disclosure, the deserved gain for the user to which the intelligent terminal participating in edge computing belongs may be calculated according to the information about participation in MEC of the intelligent terminal participating in edge computing in various methods.

For example, the method includes giving corresponding free call minutes according to the time consumed for executing the edge computing task in the information about participation in MEC of the intelligent terminal.

For another example, the method includes giving corresponding free traffic according to the amount of data consumed for executing the edge computing task in the information about participation in MEC of the intelligent terminal.

Apparently, the implementation methods are not limited to those described above, and the specific implementation method is not intended to limit the scope of the embodiments of the present disclosure.

In an embodiment of the present disclosure, the gain may be paid to the user to which the intelligent terminal participating in edge computing belongs in real time or periodically in various methods. For example, the method includes giving the free call minutes, giving free traffic, topping-up phone fees, paying cash to the user's bank card account, paying cash to the user's Alipay account, and so forth.

In an embodiment of the present disclosure, when a load of at least one resource of the MEC server meets a preset condition, an edge computing task(s) of the MEC server is(are) assigned to the intelligent terminal participating in edge computing, so that the intelligent terminal shares the edge computing task(s) of the MEC server, which makes full use of resources of the intelligent terminal, reduces load on the resources of the MEC server, and thus improves the overall service quality of the network; meanwhile, the expansion cost for an operator is reduced, the impact of a great number of intelligent terminals on the network is reduced, while idle resources of the intelligent terminal generate a gain through certain back-feeding of rights and interests, so that a win-win effect of the user and the operator is achieved.

The following embodiments are listed below to describe in detail a specific implementation process of the method for implementing edge computing according to the embodiments of the present disclosure, and the listed embodiments are only for convenience of description and cannot be used to limit the scope of the embodiments of the present disclosure.

Example 1

Figure 7:
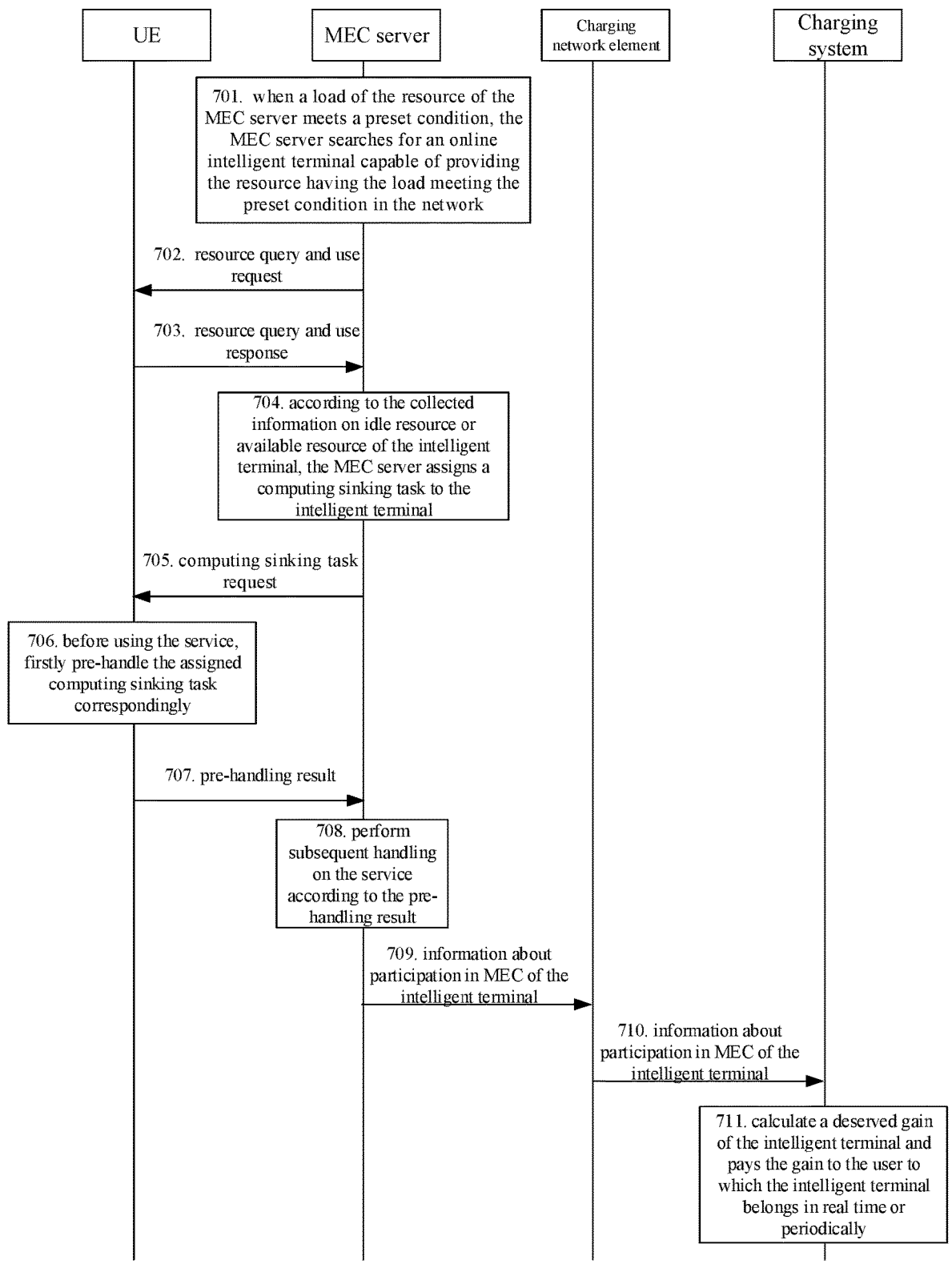
FIG. 7 is a flowchart of the method provided in Example 1 in which when the MEC server is busy, the MEC server schedules intelligent terminals for computing sinking according to an embodiment of the present disclosure.

This embodiment describes a method in which when the MEC server is busy, the MEC server schedules intelligent terminals for computing sinking. As shown in FIG. 7, the method may include operations 701 to 711.

At operation 701, the MEC server detects a load of its own resource (e.g., a CPU, memory, and/or a storage resource), and when the load of at least one resource of the MEC server meets a preset condition (e.g., the load of the at least one resource of the MEC server is greater than or equal to a preset threshold), the MEC server searches for an online intelligent terminal(s) capable of providing the resource having the load meeting the preset condition in the network.

In this operation, the MEC server may search subscription information of the online intelligent terminals for an online intelligent terminal(s) in the subscription information each of which corresponding to one or more of the at least one resource having the load meeting the preset condition, as the online intelligent terminal(s) capable of providing the resource having the load meeting the preset condition. The specific implementation is not limited thereto.

At operation 702, the MEC server sends a resource query and use request to each online intelligent terminal capable of providing the resource having the load meeting the preset condition. The resource query and use request indicates one or more of the at least one resource having the load meeting the preset condition.

At operation 703, the intelligent terminal sends a resource query and use response to the MEC server, the resource query and use response carrying information on idle resource or available resource of the intelligent terminal.

At operation 704, according to the collected information on idle resource or available resource of the intelligent terminal, the MEC server assigns a computing sinking task to the intelligent terminal (for example, selects an intelligent camera with an image processing capability for image optimization).

At operation 705, the MEC server issues a computing sinking task request to the intelligent terminal. The computing sinking task request includes: the computing sinking task assigned to the intelligent terminal.

At operation 706, before using the service, the intelligent terminal firstly pre-handles the computing sinking task correspondingly (for example, the intelligent camera performs image pre-processing locally, outputs only the changed effective image data, compresses the image, etc.).

At operation 707, the intelligent terminal sends the pre-handling result to the MEC server.

At operation 708, the MEC server performs subsequent handling on the service according to the pre-handling result.

At operation 709, the MEC server sends the information about participation in MEC of the intelligent terminal to a charging network element.

In this operation, the information about participation in MEC includes: participation duration, data amount, etc.

At operation 710, the charging network element sends the information about participation in MEC to a charging system (such as an Online Charging System (OCS), an Offline Charging System (OFCS), a Converged Charging System (CCS), etc.).

At operation 711, according to the information about participation in MEC and a predetermined rule, the charging system calculates a deserved gain of the intelligent terminal and pays the gain to the user to which the intelligent terminal belongs in real time or periodically by a certain means (for example, giving free call minutes, giving free traffic, topping-up phone fees, paying cash to the user's bank card account, paying cash to the user's Alipay account, etc.).

It should be noted that, between operations 702 to 708, other acknowledgement or handshake messages may exist, for example, multiple acknowledgements, timing feedback (timing reporting of handling results), other interactive information, and the like are performed, which are omitted here for simplicity.

In this embodiment, by sinking the computing task performed by the MEC server on an intelligent terminal service to the intelligent terminal, the amount of computing of the MEC server is reduced, and thus the concurrent service capability of the MEC server is improved.

Example 2

Figure 8:
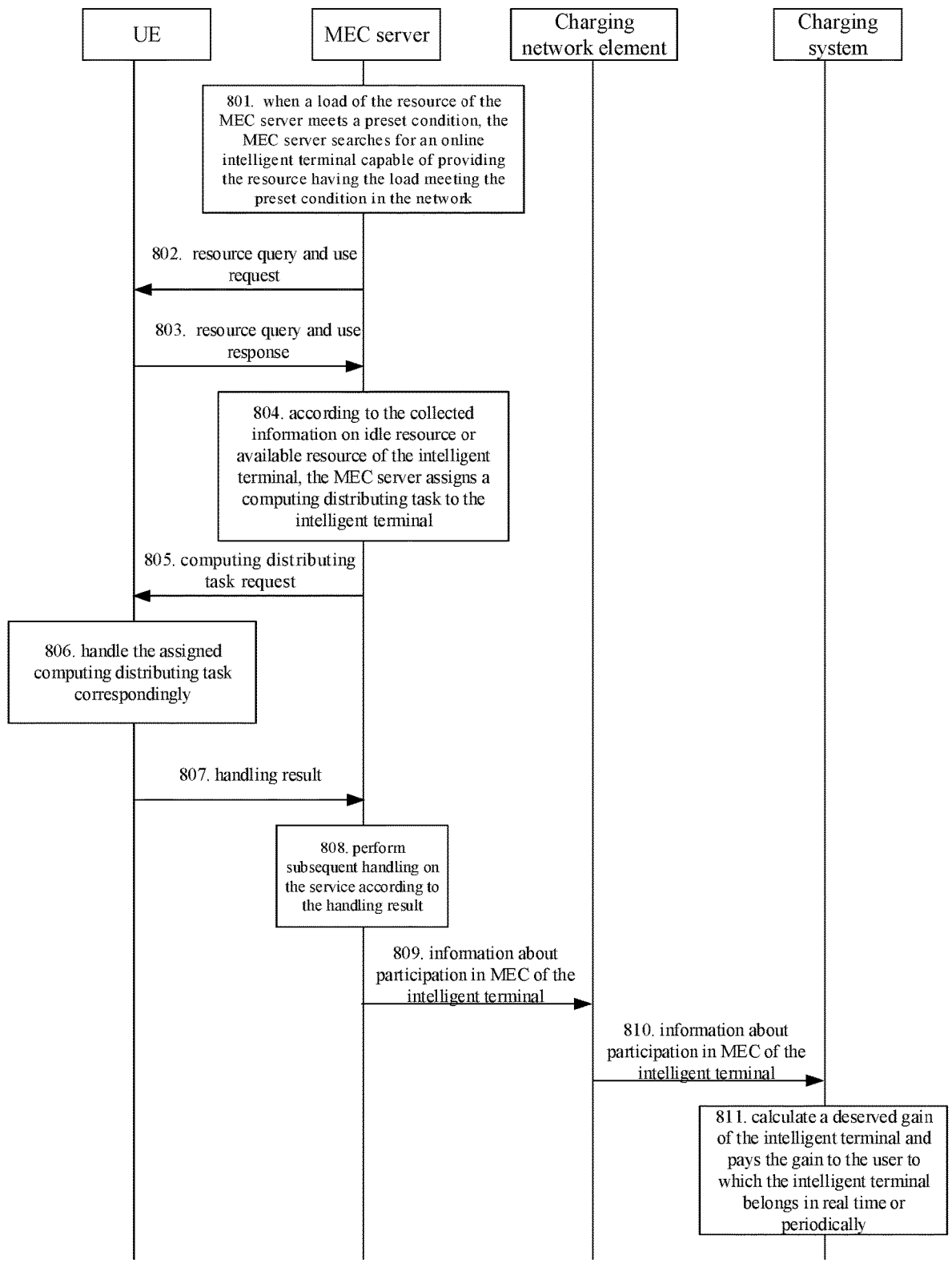
FIG. 8 is a flowchart of the method provided in Example 2 in which when the load of the CPU resource of the MEC server is heavy, some computing tasks are selected to be issued to an intelligent terminal for computing according to an embodiment of the present disclosure.

This embodiment describes a method in which when the load of the CPU resource of the MEC server is heavy, at least one computing task is selected to be issued to an intelligent terminal for computing. As shown in FIG. 8, the method may include operations 801 to 811.

At operation 801, the MEC server detects a load of its own CPU resource, and when the load of the CPU resource of the MEC server meets a preset condition (e.g., the load of the CPU resource is greater than or equal to a preset threshold), the MEC server searches for an online intelligent terminal(s) capable of providing a CPU resource in the network.

In this operation, the MEC server may search subscription information of the online intelligent terminals for an online intelligent terminal(s) in the subscription information each of which contains the CPU resource as the online intelligent terminal(s) capable of providing the CPU resource. The specific implementation is not limited thereto.

At operation 802, the MEC server sends a resource query and use request to each intelligent terminal capable of providing the CPU resource. The resource query and use request indicates: the CPU resource.

At operation 803, the intelligent terminal sends a resource query and use response to the MEC server, the resource query and use response carrying information on idle CPU resource or available CPU resource of the intelligent terminal.

At operation 804, according to the collected information on idle CPU resource or available CPU resource of the intelligent terminal, the MEC server assigns a computing distributing task to the intelligent terminal (for example, an intelligent terminal with more idle CPU resources is firstly selected, or the amount of the assigned computing distributing task is determined according to the idle CPU resources in the intelligent terminal).

At operation 805, the MEC server issues a computing distributing task request to the intelligent terminal. The computing distributing task request includes: the computing distributing task assigned to the intelligent terminal.

At operation 806, the intelligent terminal handles the assigned computing distributing task correspondingly.

At operation 807, the intelligent terminal sends the handling result to the MEC server.

At operation 808, the MEC server performs subsequent handling on the service according to the handling result.

At operation 809, the MEC server sends the information about participation in MEC of the intelligent terminal to a charging network element.

In this operation, the information about participation in MEC includes: participation duration, data amount, etc.

At operation 810, the charging network element sends the information about participation in MEC to a charging system.

At operation 811, according to the information about participation in MEC and a predetermined rule, the charging system calculates a deserved gain of the intelligent terminal and pays the gain to the user to which the intelligent terminal belongs in real time or periodically by a certain means (for example, giving free call minutes, giving free traffic, topping-up phone fees, paying cash to the user's bank card account, paying cash to the user's Alipay account, etc.).

It should be noted that, between operations 802 to 808, other acknowledgement or handshake messages may exist, which are omitted for simplicity.

In operations 804 to 808, to increase the computing safety, the same computing task may be sent to two or more intelligent terminals so that certain redundancy is ensured, and mutual verification can be carried out.

In this embodiment, by distributing the computing tasks of the MEC to intelligent terminals having idle computing resources, the amount of the computing of the MEC server is reduced, and thus the concurrent service capability of the MEC server is improved.

Example 3

Figure 9:
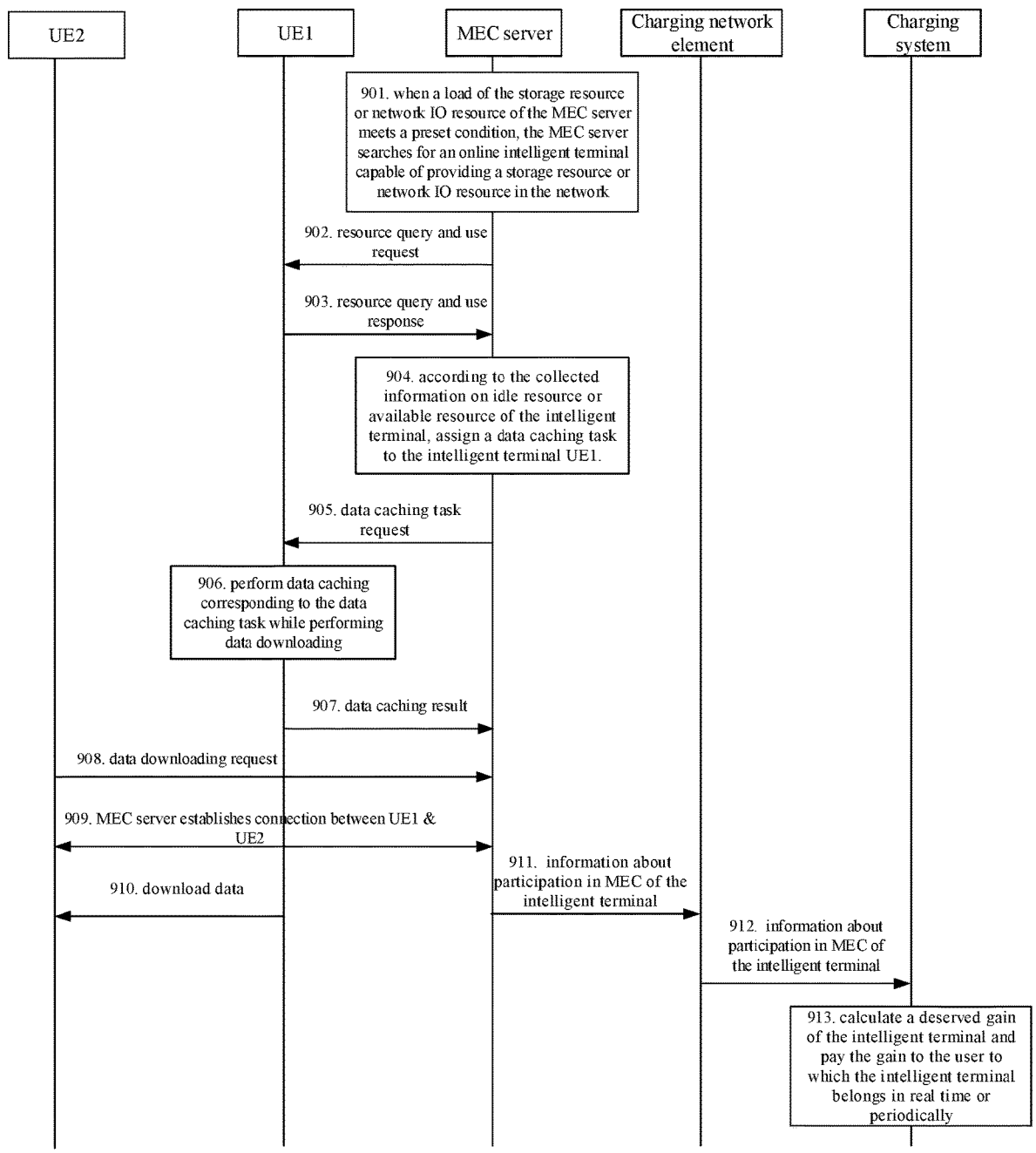
FIG. 9 is a flowchart of the method provided in Example 3 in which when the storage resources and network 10 resources of the MEC server are busy, a terminal is selected for data caching according to an embodiment of the present disclosure.

This embodiment describes a method in which when the storage resources and network IO resources of the MEC server are busy, a terminal is selected for data caching. As shown in FIG. 9, the method may include operations 901 to 913.

At operation 901, the MEC server detects loads of its own storage resource and IO resource, and when the load of the storage resource or network IO resource of the MEC server meets a preset condition (e.g., the load of the network IO resource is greater than or equal to a preset threshold), the MEC server searches for an online intelligent terminal capable of providing a storage resource or a network IO resource in the network.

In this operation, the MEC server may search subscription information of the online intelligent terminals for an online intelligent terminal in the subscription information which contains a storage resource or a network IO resource as the online intelligent terminal UE1 capable of providing the storage resource or the network IO resource. The specific implementation is not limited thereto.

At operation 902, the MEC server sends a resource query and use request to the intelligent terminal UE1 capable providing the storage resource or the network IO resource. The resource query and use request indicates at least one of the storage resource and the network IO resource.

At operation 903, the intelligent terminal UE1 sends a resource query and use response to the MEC server, the resource query and use response carrying information on idle storage resource, or information on available storage resource, or information on idle network IO resource, or information on available network IO resource of the intelligent terminal.

At operation 904, according to the collected information on idle resource or available resource of the intelligent terminal, the MEC server assigns a data caching task to the intelligent terminal UE1.

At operation 905, the MEC server issues a data caching task request to the intelligent terminal UE1. The data caching task request includes: the assigned data caching task.

At operation 906, UE1 performs data caching corresponding to the data caching task while performing data downloading.

At operation 907, UE1 sends a data caching result to the MEC server. The data caching result includes: caching successful or caching failed.

At operation 908, the MEC server receives a data downloading request from another intelligent terminal UE2.

At operation 909, the MEC server establishes a connection between the intelligent terminals (UE1 & UE2) sharing data.

In this operation, the data sharing connection between the intelligent terminals may be established by FTP, Bluetooth, or the like, or by sending a transmission command to the intelligent terminals, or the like.

For example, when a connection between UE1 and UE2 is established by Bluetooth, both UE1 and UE2 send their Bluetooth matching names to the MEC server, and then the MEC server sends the Bluetooth matching name of UE1 to UE2, and sends the Bluetooth matching name of UE2 to UE1, so that UE1 and UE2 are matched with each other according to their respective Bluetooth matching names, and thus the connection between UE1 and UE2 are established.

At operation 910, the terminal UE2 downloads data from the terminal UE1 through the established connection.

At operation 911, the MEC server sends the information about participation in MEC of the intelligent terminal UE1 to a charging network element.

At operation 912, the charging network element sends the information about participation in MEC to a charging system.

At operation 913, according to the information about participation in MEC and a predetermined rule, the charging system calculates a deserved gain of the intelligent terminal UE1 and pays the gain to the user to which the intelligent terminal belongs in real time or periodically by a certain means (for example, giving free call minutes, giving free traffic, topping-up phone fees, paying cash to the user's bank card account, paying cash to the user's Alipay account, etc.).

It should be noted that between operations 902 to 910, other acknowledgement or handshake messages may exist, which are omitted for simplicity.

In this embodiment, by caching the data in the intelligent terminal and sharing with other intelligent terminals for use, the amount of data caching and the amount of IO of sharing data of the MEC server are reduced, and thus the overall data service capacity of the MEC network is improved.

Example 4

Figure 10:
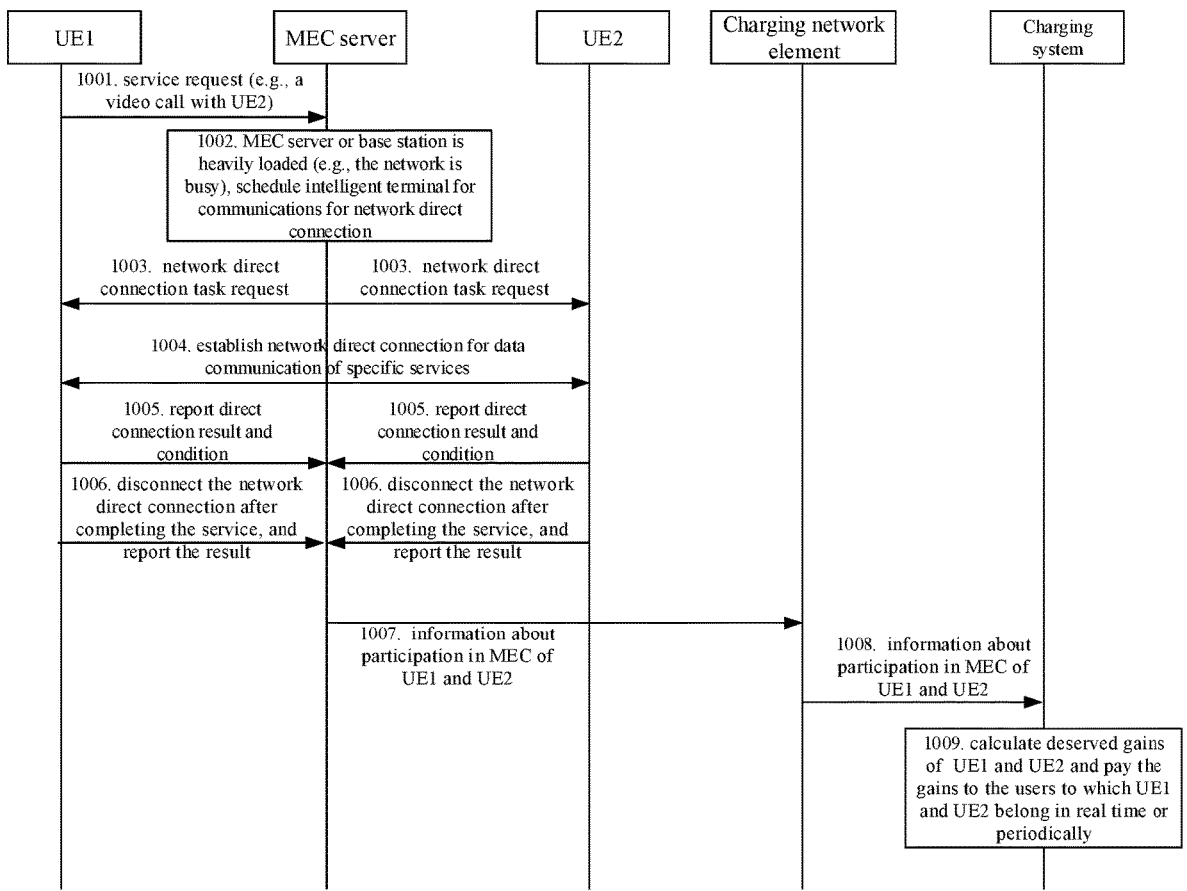
FIG. 10 is a flowchart of the method provided in Example 4 in which when the MEC server or RAN server network is busy, an intelligent terminal is selected for network direct connection according to an embodiment of the present disclosure.

This embodiment describes a method in which when the MEC server or RAN server network is busy, an intelligent terminal is selected for network direct connection. As shown in FIG. 10, the method may include operations 1001 to 1009.

At operation 1001, an intelligent terminal UE1 initiates a service request (e.g., a video call with UE2) to the MEC server.

At operation 1002, since the CPU resource or network IO resource of the MEC server or the base station is heavily loaded (for example, the network is busy), an intelligent terminal for communications is scheduled for a network direct connection.

In this operation, whether to conduct the network direct connection may be determined according to subscription information of the intelligent terminal UE1 and the intelligent terminal UE2, or may be determined by querying. The specific implementation is not limited thereto.

At operation 1003, the MEC server issues a network direct connection task request to the intelligent terminal UE1 and the intelligent terminal UE2.

At operation 1004, the network direct connection is established between the intelligent terminal UE1 and the intelligent terminal UE2 for data communication of specific services.

In this operation, the network direct connection may be established via a universal protocol such as Bluetooth, Wi-Fi and the like.

At operation 1005, the intelligent terminal UE1 and the intelligent terminal UE2 report the direct connection result to the MEC server, and may report the direct connection condition (such as duration and/or traffic) at regular time. The direct connection result includes direct connection successful or direct connection failed.

At operation 1006, after the intelligent terminal UE1 and the intelligent terminal UE2 complete the service, the network direct connection therebetween is disconnected, and a result, for example, the direct connection duration, the traffic, and the like, is reported to the MEC server.

At operation 1007, the MEC server sends the information about participation in MEC of the intelligent terminal UE1 and the intelligent terminal UE2 to a charging network element.

At operation 1008, the charging network element sends the information about participation in MEC to a charging system.

At operation 1009, according to the information about participation in MEC and a predetermined rule, the charging system calculates deserved gains of the intelligent terminal UE1 and the intelligent terminal UE2 and pays the gains to the users to which the intelligent terminal UE1 and the intelligent terminal UE2 belong in real time or periodically by a certain means (for example, giving free call minutes, giving free traffic, topping-up phone fees, paying cash to the user's bank card account, paying cash to the user's Alipay account, etc.).

It should be noted that between operations 1002 to 1010, other acknowledgement or handshake messages may exist, which are omitted for simplicity.

This embodiment may be further expanded to multi-party direct connection, or an implementation providing transfer, and with the network direct connection between the intelligent terminals, the amount of data exchange of the MEC server and the RAN is greatly reduced, and thus the overall data exchange capacity of the MEC network is improved.

Example 5

Figure 11:
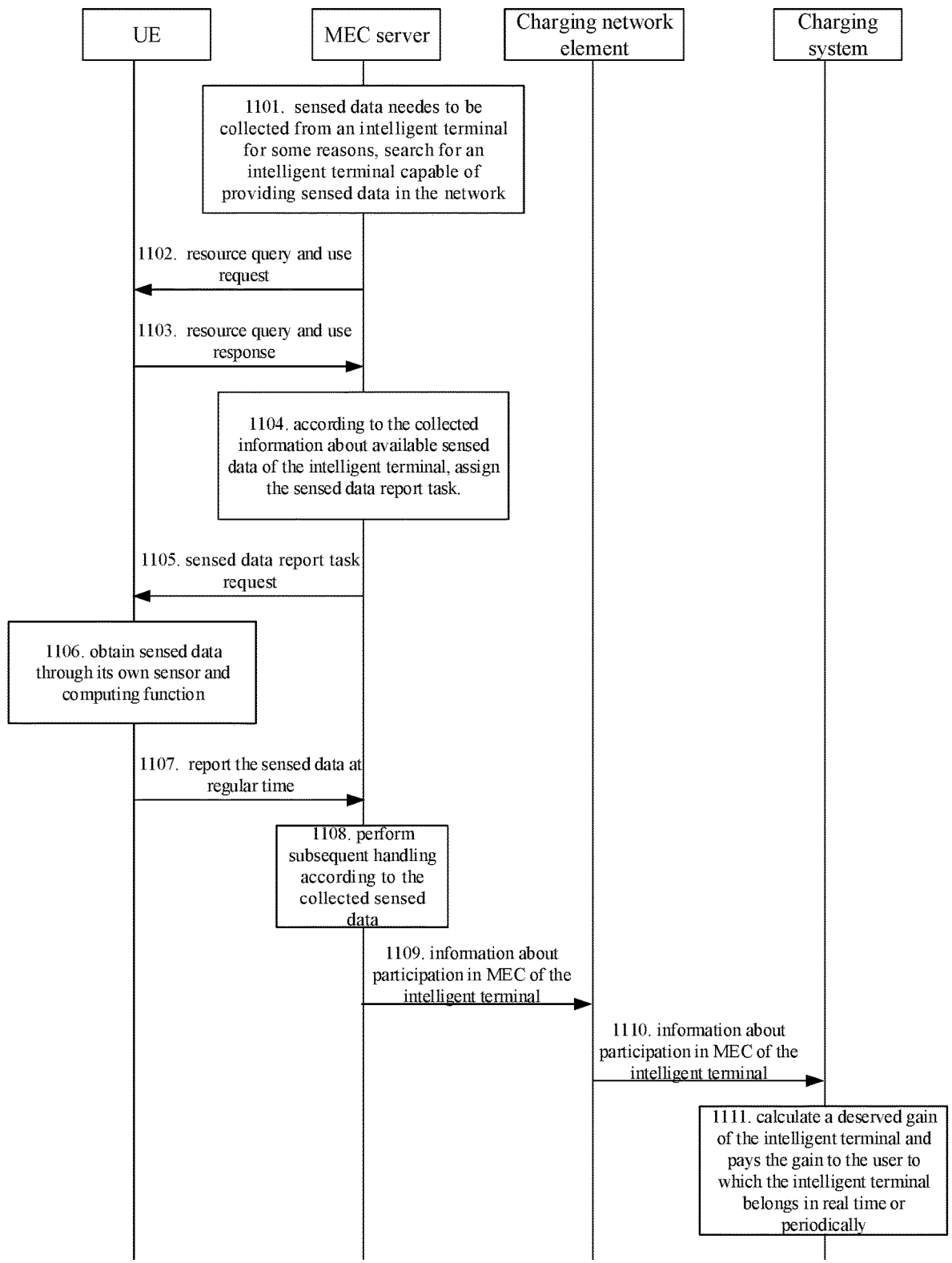
FIG. 11 is a flowchart of the method provided in Example 5 in which a terminal provides useful sensed data for MEC according to an embodiment of the present disclosure.

This embodiment describes a method in which a terminal provides useful sensed data for the MEC. As shown in FIG. 11, the method may include operations 1101 to 1111.

At operation 1101, for some reasons (e.g., sensor damage, environmental reasons affecting use of the original sensor, limited sensing ranges of sensor, etc.), an MEC server needs to collect sensed data (e.g., speed-traffic, location-positioning, temperature-fire protection, etc.) from an intelligent terminal, and the MEC server searches for an intelligent terminal capable of providing sensed data in the network.

In this operation, the MEC server may search subscription information of the online intelligent terminals for an online intelligent terminal in the subscription information which contains the sensed data as the online intelligent terminal capable of providing the sensed data. The specific implementation is not limited thereto.

At operation 1102, the MEC server sends a resource query and use request to each intelligent terminal capable of providing the sensed data. The resource query and use request indicates: the sensed data.

At operation 1103, the intelligent terminal sends a resource query and use response to the MEC server, the resource query and use response carrying information about the available sensed data of the intelligent terminal.

At operation 1104, according to the collected information about the available sensed data of the intelligent terminal, the MEC server assigns the sensed data report task.

At operation 1105, the MEC server issues a sensed data report task request to the intelligent terminal. The sensed data report task request includes: information about the sensed data to be reported.

At operation 1106, the intelligent terminal obtains the sensed data through its own sensor and computing function.

At operation 1107, the intelligent terminal reports the sensed data at regular time.

At operation 1108, the MEC server performs subsequent handling according to the collected sensed data.

At operation 1109, the MEC server sends the information about participation in MEC of the intelligent terminal to a charging network element.

At operation 1110, the charging network element sends the information about participation in MEC to a charging system.

At operation 1111, according to the information about participation in MEC and a predetermined rule, the charging system calculates a deserved gain of the intelligent terminal and pays the gain to the user to which the intelligent terminal belongs in real time or periodically by a certain means (for example, giving free call minutes, giving free traffic, topping-up phone fees, paying cash to the user's bank card account, paying cash to the user's Alipay account, etc.).

It should be noted that between operations 1102 to 1108, other acknowledgement or handshake messages may exist, which are omitted for simplicity.

In this embodiment, by collecting the sensed data from the intelligent terminal, the sensed data required by the MEC server for computing is compensated for or enriched, and thus indexes including effectiveness, accuracy, precision and the like of the MEC service are improved.

Another embodiment of the present disclosure provides a device for implementing edge computing, including a processor, and a computer readable storage medium having instructions stored thereon which, when executed by the processor, cause any of the methods for implementing edge computing as described above to be implemented.

Another embodiment of the present disclosure provides a computer readable storage medium having a computer program stored thereon which, when executed by a processor, causes operations of any of the methods for implementing edge computing as described above to be implemented.

Figure 12:
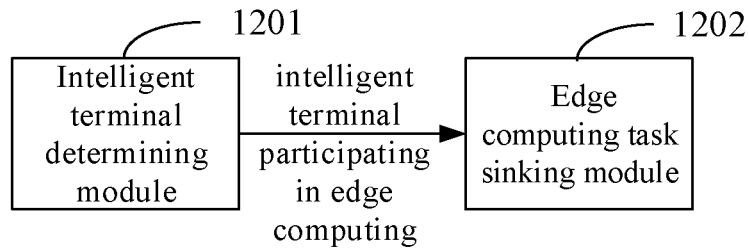
FIG. 12 is a schematic diagram illustrating structural components of a device for implementing edge computing according to another embodiment of the present disclosure.

Referring to FIG. 12, another embodiment of the present disclosure provides a device (e.g., an MEC server) for implementing edge computing, including: an intelligent terminal determining module 1201 configured to determine, when a load of at least one resource of an MEC server meets a preset condition, at least one intelligent terminal participating in edge computing; an edge computing task sinking module 1202 configured to assign, for each intelligent terminal participating in edge computing, at least one edge computing task of the MEC server to the intelligent terminal participating in edge computing, and issue the at least one assigned edge computing task to the intelligent terminal participating in edge computing; and receive a handling result of the at least one assigned edge computing task sent from the intelligent terminal participating in edge computing, and send to a charging network element information about participation in MEC of the intelligent terminal participating in edge computing.

In an embodiment of the present disclosure, the edge computing task sinking module 1202 is further configured to: establish a secure connection with the intelligent terminal participating in edge computing; and communicate with the intelligent terminal participating in edge computing through the established secure connection.

In an embodiment of the present disclosure, the edge computing task sinking module 1202 is further configured to: receive a service request sent from an intelligent terminal not participating in edge computing, and establish a connection between the intelligent terminal participating in edge computing and the intelligent terminal not participating in edge computing.

In an embodiment of the present disclosure, the edge computing task sinking module 1202 is further configured to: receive a handling progress of the at least one assigned edge computing task sent from the intelligent terminal participating in edge computing.

In an embodiment of the present disclosure, the intelligent terminal determining module 1201 is configured to determine the at least one intelligent terminal participating in edge computing by: acquiring online intelligent terminals capable of providing the resource having the load meeting the preset condition; and selecting at least one intelligent terminal from the online intelligent terminals capable of providing the resource having the load meeting the preset condition.

In an embodiment of the present disclosure, the intelligent terminal determining module 1201 is configured to acquire online intelligent terminals capable of providing the resource having the load meeting the preset condition by: searching subscription information of online intelligent terminals for online intelligent terminal(s) in the subscription information each of which corresponding to one or more of the at least one resource having the load meeting the preset condition, as the online intelligent terminals capable of providing the resource having the load meeting the preset condition; or searching a preset correspondence relation between intelligent terminals and resources for intelligent terminals each corresponding to one or more of the at least one resource having the load meeting the preset condition, and selecting online intelligent terminals from the found intelligent terminals as the online intelligent terminals capable of providing the resource having the load meeting the preset condition; or searching a preset correspondence relation among intelligent terminals, resources and states for intelligent terminals each corresponding to one or more of the at least one resource having the load meeting the preset condition and corresponding to an online state, and taking the found intelligent terminals as the online intelligent terminals capable of providing the resource having the load meeting the preset condition.

In an embodiment of the present disclosure, the intelligent terminal determining module 1201 is configured to select the at least one intelligent terminal from the online intelligent terminals capable of providing the resource having the load meeting the preset condition by: sending a first request to each online intelligent terminal capable of providing the resource having the load meeting the preset condition; the first request indicating one or more of the at least one resource having the load meeting the preset condition; receiving a first response from the online intelligent terminal capable of providing the resource having the load meeting the preset condition, the first response including: information on idle resource or available resource in the online intelligent terminal for a resource indicated in the first request; and selecting at least one intelligent terminal sending the first response.

In an embodiment of the present disclosure, the edge computing task sinking module 1202 is configured to assign the at least one edge computing task of the MEC server to the intelligent terminal participating in edge computing by: assigning the at least one edge computing task of the MEC server to the intelligent terminal participating in edge computing according to the information on idle resource or available resource in the intelligent terminal for the resource indicated in the first request.

In an embodiment of the present disclosure, the load of the at least one resource meeting the preset condition includes a case where the load of the at least one resource is greater than or equal to a preset threshold.

In an embodiment of the present disclosure, the edge computing task includes any one of: a computing sinking task, a computing distributing task, a data caching task, a network direct connection task, and a sensed data report task.

In an embodiment of the present disclosure, the at least one resource includes at least one of: a CPU resource, a memory resource, a storage resource, a network input/output (IO) resource, or sensed data.

Figure 13:
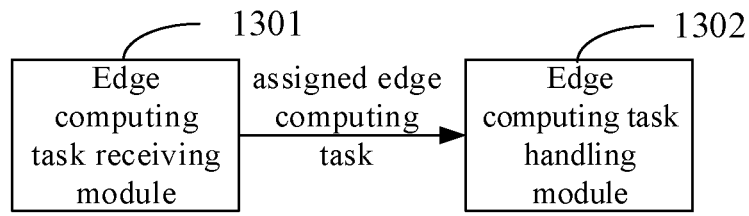
FIG. 13 is a schematic diagram illustrating structural components of a device for implementing edge computing according to another embodiment of the present disclosure.

Referring to FIG. 13, another embodiment of the present disclosure provides a device (e.g., an intelligent terminal) for implementing edge computing, including: an edge computing task receiving module 1301 configured to receive an assigned edge computing task issued from a multi-access edge computing (MEC) server; and an edge computing task handling module 1302 configured to handle the assigned edge computing task correspondingly, and send a handling result of the assigned edge computing task to the MEC server.

In an embodiment of the present disclosure, the edge computing task receiving module 1301 is further configured to: establish a secure connection with the MEC server; and communicate with the MEC server through the established secure connection.

In an embodiment of the present disclosure, the edge computing task handling module 1302 is further configured to: send a handling progress of the assigned edge computing task to the MEC server.

In an embodiment of the present disclosure, the edge computing task receiving module 1301 is further configured to: receive a first request sent from the MEC server; the first request indicating one or more of at least one the resource having a load meeting a preset condition in the MEC server; and send a first response to the MEC server; the first response including: information on idle resource or available resource for a resource indicated in the first request.

In an embodiment of the present disclosure, the edge computing task handling module 1302 is further configured to: establish a connection with an intelligent terminal not participating in edge computing through the MEC server; and provide a service for the intelligent terminal not participating in edge computing through the established connection.

Figure 14:
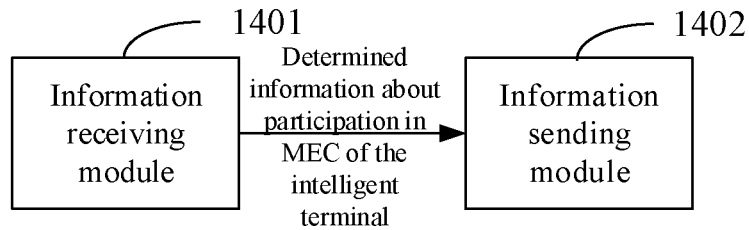
FIG. 14 is a schematic diagram illustrating structural components of a device for implementing edge computing according to another embodiment of the present disclosure.

Referring to FIG. 14, another embodiment of the present disclosure provides a device (e.g., a charging network element) for implementing edge computing, including: an information receiving module 1401 configured to receive information about participation in multi-access edge computing (MEC) of an intelligent terminal participating in edge computing, the information being sent from an MEC server; and an information sending module 1402 configured to carry the information about participation in MEC of the intelligent terminal participating in edge computing in charging information and send the charging information to a charging system.

The specific implementation process of the device for implementing edge computing is the same as that of the method for implementing edge computing in the foregoing embodiment, and thus is not described here again.

Figure 15:
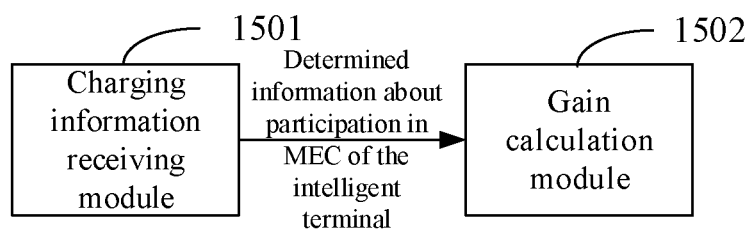
FIG. 15 is a schematic diagram illustrating structural components of a system for implementing edge computing according to another embodiment of the present disclosure.

Referring to FIG. 15, another embodiment of the present disclosure provides a system (e.g., a charging system) for implementing edge computing, including: a charging information receiving module 1501 configured to receive charging information sent from a charging network element; the charging information including information about participation in multi-access edge computing (MEC) of an intelligent terminal participating in edge computing; and a gain calculation module 1502 configured to calculate, according to the information about participation in MEC of the intelligent terminal participating in edge computing, a deserved gain for a user to which the intelligent terminal participating in edge computing belongs, and pay the gain to the user to which the intelligent terminal participating in edge computing belongs in real time or periodically.

Figure 16:
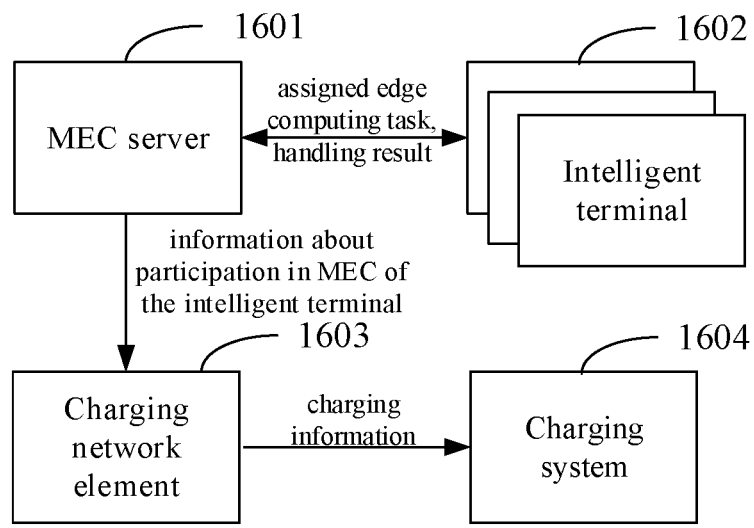
FIG. 16 is a schematic diagram illustrating structural components of a system for implementing edge computing according to another embodiment of the present disclosure.

Referring to FIG. 16, another embodiment of the present disclosure provides a system for implementing edge computing, including: an MEC server 1601 configured to determine, when a load of at least one resource of the MEC server meeting a preset condition, at least one intelligent terminal participating in edge computing; assign, for each intelligent terminal participating in edge computing, at least one edge computing task of the MEC server to the intelligent terminal participating in edge computing, and issue the at least one assigned edge computing task to the intelligent terminal participating in edge computing; and receive a handling result of the at least one assigned edge computing task sent from the intelligent terminal participating in edge computing, and send to a charging network element information about participation in MEC of the intelligent terminal participating in edge computing; and at least one intelligent terminal 1602 participating in edge computing, each configured to receive an assigned edge computing task issued from the multi-access edge computing (MEC) server; and handle the assigned edge computing task correspondingly, and send a handling result of the assigned edge computing task to the MEC server; a charging network element 1603 configured to receive information about participation in MEC of an intelligent terminal participating in edge computing, the information being sent from the MEC server; and carrying the information about participation in MEC of the intelligent terminal participating in edge computing in the charging information and send the charging information to a charging system; and the charging system 1604 configured to receive charging information sent from the charging network element; the charging information including information about participation in multi-access edge computing (MEC) of an intelligent terminal participating in edge computing; and calculate, according to the information about participation in MEC of the intelligent terminal participating in edge computing, a deserved gain for a user to which the intelligent terminal participating in edge computing belongs, and pay the gain to the user to which the intelligent terminal participating in edge computing belongs in real time or periodically.

In an embodiment of the present disclosure, the MEC server 1601 is further configured to: establish a secure connection with the intelligent terminal participating in edge computing; and communicate with the intelligent terminal participating in edge computing through the established secure connection; and the intelligent terminal 1602 is further configured to: establish a secure connection with the MEC server; and communicate with the MEC server through the established secure connection.

In an embodiment of the present disclosure, the MEC server 1601 is further configured to: receive a service request sent from an intelligent terminal not participating in edge computing, and establish a connection between the intelligent terminal participating in edge computing and the intelligent terminal not participating in edge computing; and the intelligent terminal 1602 is further configured to: establish a connection with an intelligent terminal not participating in edge computing through the MEC server; and provide a services for the intelligent terminal not participating in edge computing through the established connection.

In another embodiment of the present disclosure, the MEC server 1601 is further configured to: receive a handling progress of the assigned edge computing task sent from the intelligent terminal participating in edge computing; the intelligent terminal 1602 is further configured to: send a handling progress of the assigned edge computing task to the MEC server.

In an embodiment of the present disclosure, the MEC server 1601 is configured to determine the at least one intelligent terminal participating in edge computing by: acquiring online intelligent terminals capable of providing the resource having the load meeting the preset condition; and selecting at least one intelligent terminal from the online intelligent terminals capable of providing the resource having the load meeting the preset condition.

In an embodiment of the present disclosure, the MEC server 1601 is configured to acquire online intelligent terminals capable of providing the resource having the load meeting the preset condition by: searching subscription information of the online intelligent terminals for online intelligent terminals in the subscription information, each of which corresponding to one or more of the at least one resource having the load meeting the preset condition, as the online intelligent terminals capable of providing the resource having the load meeting the preset condition; or searching a preset correspondence relation between intelligent terminals and resources for intelligent terminals each corresponding to one or more of the at least one resource having the load meeting the preset condition, and selecting online intelligent terminals from the found intelligent terminals as the online intelligent terminals capable of providing the resource having the load meeting the preset condition; or searching a preset correspondence relation among intelligent terminals, resources and states for intelligent terminals each corresponding to one or more of the at least one resource having the load meeting the preset condition and corresponding to an online state, and taking the found intelligent terminals as the online intelligent terminals capable of providing the resource having the load meeting the preset condition.

In an embodiment of the present disclosure, the MEC server 1601 is configured to select the at least one intelligent terminal from the online intelligent terminals capable of providing the resource having the load meeting the preset condition by: sending a first request to each online intelligent terminal capable of providing the resource having the load meeting the preset condition; the first request indicating one or more of the at least one resource having the load meeting the preset condition; receiving a first response from the online intelligent terminal capable of providing the resource having the load meeting the preset condition, the first response including: information on idle resource or available resource in the online intelligent terminal for a resource indicated in the first request; and selecting at least one intelligent terminal sending the first response.

The intelligent terminal 1602 is further configured to: receive a first request sent from the MEC server; the first request indicating one or more of the at least one resource having the load meeting the preset condition in the MEC server; and send a first response to the MEC server; the first response including: information on idle resource or available resource for a resource indicated in the first request.

In an embodiment of the present disclosure, the MEC server 1601 is configured to assign the at least one edge computing task of the MEC server to the intelligent terminal participating in edge computing by: assigning the at least one edge computing task of the MEC server to the intelligent terminal participating in edge computing according to the information on idle resource or available resource in the intelligent terminal for the resource indicated in the first request.

In an embodiment of the present disclosure, the load of the at least one resource meeting the preset condition includes a case where the load of the at least one resource is greater than or equal to a preset threshold.

In an embodiment of the present disclosure, the edge computing task includes any one of: a computing sinking task, a computing distributing task, a data caching task, a network direct connection task and a sensed data report task.

In an embodiment of the present disclosure, the at least one resource includes at least one of: a CPU resource, a memory resource, a storage resource, a network input/output (IO) resource, or sensed data.

The specific implementation process of the system for implementing edge computing is the same as that of the method for implementing edge computing in the foregoing embodiment, and thus is not described here again.

Those of ordinary skill in the art will appreciate that all or some operations of the above-described method, functional modules/units in the system and device may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all components may be implemented as software executed by a processor, such as a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those skilled in the art that communication medium typically includes a computer-readable instruction, a data structure, a program module, or other data in a modulated data signal, such as a carrier wave or other transport mechanism, and may include any information delivery medium.

Despite the implementations disclosed in the embodiments of the present disclosure as described above, they are merely implementations used to facilitate the understanding of the embodiments of the present disclosure, and are not intended to limit the embodiments of the present disclosure. Any modification and variation in the form and details of the embodiments of the disclosure can be made by any person skilled in the art of the present disclosure without departing from the spirit and scope disclosed by the embodiments of the disclosure. However, the scope of protection of the embodiments of the disclosure is defined by the scope of the appended claims.

What is claimed is:

1. A method for implementing edge computing, comprising:
   determining, when a load of at least one resource of a multi-access edge computing (MEC) server meets a preset condition, at least one intelligent terminal participating in edge computing;
   assigning, for each intelligent terminal participating in edge computing, at least one edge computing task of the MEC server to the intelligent terminal participating in edge computing, and issuing the at least one assigned edge computing task to the intelligent terminal participating in edge computing; and receiving a handling result of the at least one assigned edge computing task sent from the intelligent terminal participating in edge computing, and sending to a charging network element information about participation in MEC of the intelligent terminal participating in edge computing,
   wherein the intelligent terminal participating in edge computing is a user equipment, and
   wherein the edge computing task comprises any one of: a computing sinking task, a data caching task, a network direct connection task, or a sensed data report task.

2. The method according to claim 1, wherein before issuing the at least one assigned edge computing task to the intelligent terminal participating in edge computing, the method further comprises:
   establishing a secure connection with the intelligent terminal participating in edge computing; and
   communicating with the intelligent terminal participating in edge computing through the established secure connection.

3. The method according to claim 1, wherein after receiving the handling result of the at least one assigned edge computing task sent from the intelligent terminal participating in edge computing, the method further comprises:
receiving a service request sent from an intelligent terminal not participating in edge computing, and establishing a connection between the intelligent terminal participating in edge computing and the intelligent terminal not participating in edge computing.

4. The method according to claim 1, wherein after issuing the at least one assigned edge computing task to the intelligent terminal participating in edge computing, and before receiving the handling result of the at least one assigned edge computing task sent from the intelligent terminal participating in edge computing, the method further comprises:
receiving a handling progress of the at least one assigned edge computing task sent from the intelligent terminal participating in edge computing.

5. The method according to claim 1, wherein the determining the at least one intelligent terminal participating in edge computing comprises:
acquiring online intelligent terminals capable of providing the resource having the load meeting the preset condition; selecting at least one intelligent terminal from the online intelligent terminals capable of providing the resource having the load meeting the preset condition; or
determining, when both intelligent terminals initiating a service request are capable of providing the resource having the load meeting the preset condition, the at least one intelligent terminal participating in edge computing as the both intelligent terminals initiating the service request.

6. The method according to claim 5, wherein the acquiring online intelligent terminals capable of providing the resource having the load meeting the preset condition comprises:
searching subscription information of online intelligent terminals for online intelligent terminals in the subscription information, each of which corresponding to one or more of the at least one resource having the load meeting the preset condition, as the online intelligent terminals capable of providing the resource having the load meeting the preset condition; or
searching a preset correspondence relation between intelligent terminals and resources for intelligent terminals each corresponding to one or more of the at least one resource having the load meeting the preset condition, and selecting online intelligent terminals from the found intelligent terminals as the online intelligent terminals capable of providing the resource having the load meeting the preset condition; or
searching a preset correspondence relation among intelligent terminals, resources and states for intelligent terminals each corresponding to one or more of the at least one resource having the load meeting the preset condition and corresponding to an online state, and taking the found intelligent terminals as the online intelligent terminals capable of providing the resource having the load meeting the preset condition.

7. The method according to claim 5, wherein the selecting the at least one intelligent terminal from the online intelligent terminals capable of providing the resource having the load meeting the preset condition comprises:
sending a first request to each online intelligent terminal capable of providing the resource having the load meeting the preset condition; wherein the first request indicating one or more of the at least one resource having the load meeting the preset condition;
receiving a first response from the online intelligent terminal capable of providing the resource having the load meeting the preset condition, wherein the first response comprises: information on idle resource or available resource in the online intelligent terminal for a resource indicated in the first request; and
selecting at least one online intelligent terminal sending the first response.

8. The method according to claim 7, wherein the assigning the at least one edge computing task of the MEC server to the intelligent terminal participating in edge computing comprises:
assigning the at least one edge computing task of the MEC server to the intelligent terminal participating in edge computing according to the information on idle resource or available resource in the intelligent terminal for the resource indicated in the first request.

9. The method according to claim 1, wherein the load of the at least one resource meeting the preset condition comprises a case where the load of the at least one resource is greater than or equal to a preset threshold;
or
wherein the at least one resource comprises at least one of: a CPU resource, a memory resource, a storage resource, a network input/output (IO) resource, or sensed data.

10. A device for implementing edge computing, comprising a processor and a non-transitory computer readable storage medium having instructions stored thereon which, when executed by the processor, cause the method for implementing edge computing according to claim 1 to be implemented.

11. A non-transitory computer readable storage medium having a computer program stored thereon which, when executed by a processor, causes the method for implementing edge computing according to claim 1 to be implemented.

12. A system for implementing edge computing, comprising:
a multi-access edge computing (MEC) server configured to perform the method of claim 1;
one or more intelligent terminals participating in edge computing; wherein each intelligent terminal participating in edge computing is configured to receive an assigned edge computing task issued from the MEC server; and handle the assigned edge computing task correspondingly, and send a handling result of the assigned edge computing task to the MEC server;
a charging network element configured to receive information about participation in MEC of an intelligent terminal participating in edge computing, the information being sent from the MEC server; and carry the information about participation in MEC of the intelligent terminal participating in edge computing in charging information and send the charging information to a charging system; and
a charging system configured to receive charging information sent from the charging network element; wherein the charging information comprises information about participation in multi-access edge computing (MEC) of an intelligent terminal participating in edge computing; and calculate, according to the information about participation in MEC of the intelligent terminal participating in edge computing, a deserved gain for a user to which the intelligent terminal participating in edge computing belongs, and pay the gain to the user to which the intelligent terminal participating in edge computing belongs in real time or periodically.

13. A method for implementing edge computing, comprising:
receiving an assigned edge computing task issued from a multi-access edge computing (MEC) server; and
handling the assigned edge computing task correspondingly, and sending a handling result of the assigned edge computing task to the MEC server,
wherein the method is performed by a user equipment, and
wherein the edge computing task comprises any one of: a computing sinking task, a data caching task, a network direct connection task, or a sensed data report task.

14. The method according to claim 13, wherein before receiving the assigned edge computing task issued from the MEC server, the method further comprises:
establishing a secure connection with the MEC server; and
communicating with the MEC server through the established secure connection.

15. The method according to claim 13, wherein during the handling the assigned edge computing task correspondingly, the method further comprises:
sending a handling progress of the assigned edge computing task to the MEC server;
or
wherein before receiving the assigned edge computing task issued from the MEC server, the method further comprises: receiving a first request sent from the MEC server; wherein the first request indicating one or more of at least one resource having a load meeting a preset condition in the MEC server; and sending a first response to the MEC server; wherein the first response comprises: information on idle resource or available resource for a resource indicated in the first request;
or
wherein after sending the handling result of the assigned edge computing task to the MEC server, the method further comprises: establishing a connection with an intelligent terminal not participating in edge computing through the MEC server; and providing a service for the intelligent terminal not participating in edge computing through the established connection.

16. A device for implementing edge computing, comprising a processor and a non-transitory computer readable storage medium having instructions stored thereon which, when executed by the processor, cause the method for implementing edge computing according to claim 13 to be implemented.

17. A method for implementing edge computing, comprising:
receiving information about participation in multi-access edge computing (MEC) of an intelligent terminal participating in edge computing, the information being sent from an MEC server, wherein the information about participation in MEC of the intelligent terminal participating in edge computing refers to information that is capable of proving that the intelligent terminal executes an edge computing task; and
carrying the information about participation in MEC of the intelligent terminal participating in edge computing in charging information and sending the charging information to a charging system,
wherein the intelligent terminal participating in edge computing is a user equipment, and
wherein the edge computing task comprises any one of: a computing sinking task, a data caching task, a network direct connection task, or a sensed data report task.

18. A device for implementing edge computing, comprising a processor and a non-transitory computer readable storage medium having instructions stored thereon which, when executed by the processor, cause the method for implementing edge computing according to claim 17 to be implemented.

19. A method for implementing edge computing, comprising:
receiving charging information sent from a charging network element; wherein the charging information comprises information about participation in multi-access edge computing (MEC) of an intelligent terminal participating in edge computing, wherein the information about participation in MEC of the intelligent terminal participating in edge computing refers to information that is capable of proving that the intelligent terminal executes an edge computing task; and
calculating, according to the information about participation in MEC of the intelligent terminal participating in edge computing, a deserved gain for a user to which the intelligent terminal participating in edge computing belongs, and paying the gain to the user to which the intelligent terminal participating in edge computing belongs in real time or periodically,
wherein the intelligent terminal participating in edge computing is a user equipment, and
wherein the edge computing task comprises any one of: a computing sinking task, a data caching task, a network direct connection task, or a sensed data report task.

20. A system for implementing edge computing, comprising a processor and a non-transitory computer readable storage medium having instructions stored thereon which, when executed by the processor, cause the method for implementing edge computing according to claim 19 to be implemented.

* * * * *